(12) United States Patent
LaPlante et al.

(10) Patent No.: US 11,821,268 B2
(45) Date of Patent: Nov. 21, 2023

(54) CONNECTOR FOR WELLBORE TUBULARS

(71) Applicant: Well Engineering Technology FZCO, Dubai (AE)

(72) Inventors: Anthony LaPlante, Dubai (AE); Steven Duthie Nicol, Aberdeenshire (GB)

(73) Assignee: WELL ENGINEERING TECHNOLOGY FZCO, Dubai (AE)

( * ) Notice: Subject to any disclaimer, the term of this patent is extended or adjusted under 35 U.S.C. 154(b) by 176 days.

(21) Appl. No.: 17/610,677

(22) PCT Filed: May 14, 2020

(86) PCT No.: PCT/GB2020/051179
§ 371 (c)(1),
(2) Date: Nov. 11, 2021

(87) PCT Pub. No.: WO2020/234567
PCT Pub. Date: Nov. 26, 2020

(65) Prior Publication Data
US 2022/0243539 A1 Aug. 4, 2022

(30) Foreign Application Priority Data

May 21, 2019 (GB) ..................................... 1907138

(51) Int. Cl.
*E21B 17/046* (2006.01)
*E21B 17/043* (2006.01)
*F16L 37/091* (2006.01)

(52) U.S. Cl.
CPC ........ *E21B 17/0465* (2020.05); *E21B 17/043* (2013.01); *F16L 37/091* (2013.01)

(58) Field of Classification Search
CPC ........ E21B 17/02; E21B 17/04; E21B 17/043; E21B 17/046; E21B 17/0465; E21B 17/041; F16L 37/091; F16L 37/0925
See application file for complete search history.

(56) References Cited

U.S. PATENT DOCUMENTS 4,936,618 A * 6/1990 Sampa .................... E21B 23/14
285/39
5,306,050 A * 4/1994 Laflin ................. F16L 37/0847
285/119

(Continued)

FOREIGN PATENT DOCUMENTS

EP 2835492 A2 2/2015
GB 2420579 A 5/2006

(Continued)

*Primary Examiner* — David Carroll
(74) *Attorney, Agent, or Firm* — KIRTON McCONKIE; Evan R. Witt

(57) ABSTRACT

A connector for connecting a first wellbore tubular to a second wellbore tubular includes a tubular housing connectable to the second tubular and an internal surface facing an internal bore, and a ramp assembly arranged around the surface having a plurality of elongate ramp arrays and a plurality of elongate channels arranged to separate adjacent ramp arrays. The connector includes a slip body which is insertable into the internal bore having an internal surface with at least one slip tooth for engaging the first tubular, an external surface and a ramp assembly arranged around the external surface having a plurality of elongate ramp arrays which grip the first tubular and a plurality of elongate channels arranged to separate adjacent ramp arrays. The ramp arrays of the slip body are each alignable with a respective channel of the tubular housing. The slip body is rotatable within the tubular housing.

39 Claims, 9 Drawing Sheets

(56) References Cited

U.S. PATENT DOCUMENTS

| | | | | |
|---|---|---|---|---|
| 5,403,043 | A | * | 4/1995 | Smet .................. E21B 17/0423 285/391 |
| 5,407,292 | A | * | 4/1995 | Collins ................ E21B 17/046 403/339 |
| 5,415,441 | A | | 5/1995 | Kilgore et al. |
| 5,988,702 | A | * | 11/1999 | Sas-Jaworsky ....... F16L 19/086 285/259 |
| 6,257,792 | B1 | * | 7/2001 | Read, Jr. ................ F16D 1/116 166/242.6 |
| 6,481,498 | B1 | * | 11/2002 | Ackroyd ................ E21B 17/04 166/242.6 |
| 2003/0234538 | A1 | | 12/2003 | Hashem |
| 2012/0097384 | A1 | | 4/2012 | Valencia et al. |
| 2014/0020911 | A1 | | 1/2014 | Martinez |
| 2015/0240571 | A1 | * | 8/2015 | Bowles .................. E21B 17/04 285/351 |

FOREIGN PATENT DOCUMENTS

| | | |
|---|---|---|
| GB | 2532064 A | 5/2016 |
| WO | 0109543 A1 | 2/2001 |
| WO | 2007103686 A1 | 9/2007 |

\* cited by examiner

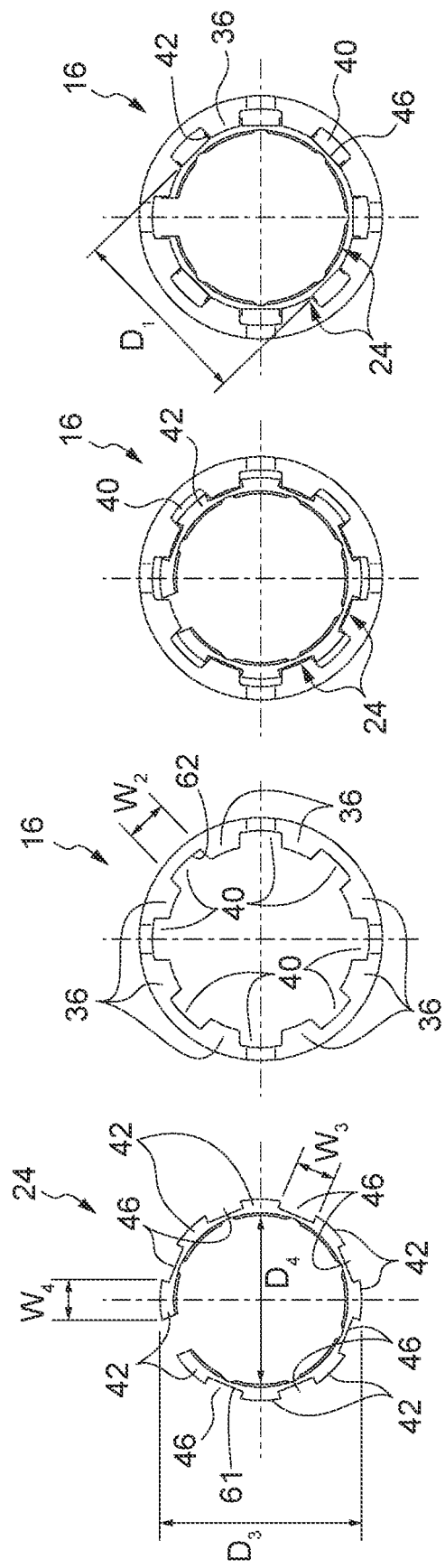

CONNECTOR FOR WELLBORE TUBULARS

The present invention relates to a connector for connecting a first wellbore tubular to a second wellbore, and to a corresponding method. In particular, but not exclusively, the present invention relates to a connector comprising a tubular housing having an internal bore which receives the first wellbore tubular, the housing being connectable to the second wellbore tubular, and a slip body which is insertable in the internal bore of the tubular housing, comprising at least one slip tooth for engaging the first tubular.

In the oil and gas exploration and production industry, wellbore fluids comprising oil and/or gas are recovered to surface through a wellbore which is drilled from surface. The wellbore is lined with metal wellbore-lining tubing, which is known in the industry as casing, and which is cemented in place within the drilled wellbore.

It is frequently necessary to deploy tools and equipment into the wellbore to perform an operation in the well, such as during an intervention procedure, a drilling procedure or a milling procedure. Such may be carried out in a cased wellbore, or in an open hole environment.

One way in which this can be achieved is to make up a tool string comprising lengths of tubing which are coupled together end-to-end via 'pin and box' connectors, the tools/ equipment being carried into the wellbore suspended from the tubing. However, the assembly and subsequent retrieval of such tool strings is time consuming, due to the many connections which must be made-up and broken-out. Also, storage of the tubing sections used to form the string takes up significant space, which may be limited, particularly in the case of an offshore rig or vessel.

One way in which tools and equipment can be quickly deployed into a well, and subsequently retrieved, is to use 'coiled tubing'. Coiled tubing comprises a continuous length of tubing which is stored on a reel or spool at surface, for example on a rig. The coiled tubing is unwound from the reel, straightened, and then deployed into the well carrying a tool string which includes the required tools/equipment, located on an end of the coiled tubing. A sufficient length of coiled tubing is deployed from the reel to position the tools/equipment at the desired depth in the wellbore.

Connection of the tool string to the end of the coiled tubing requires the use of a special coiled tubing connector. The connector typically comprises a housing having an upper end which fits over the lower end of the coiled tubing, and a lower end which is secured to the tool string, for example via a conventional threaded connection. A 'slip' is disposed in the housing between an external surface of the coiled tubing and an internal surface of the housing, and comprises a series of inclined slip teeth which extend around an inner surface of the slip. The slip is urged inwardly by travelling up an inclined ramp disposed in the housing, moving radially inwardly toward the coiled tubing so that the slip teeth bite into the tubing. This secures the connector to the tubing, and so the tool string (connected to the lower end of the connector housing) to the coiled tubing.

One such prior connector is shown in FIG. 12. The connector comprises a top sub 1 which receives the coiled tubing, a bottom sub 2 which is connected to the tool string, a slip 3 and a spacer 4. The bottom sub 2 is coupled to the top sub 1 via a threaded connection 5, which causes the spacer 4 to translate the slip 3 relative to the top sub when the bottom sub is threaded into the top sub. This advances the slip 3 along a ramp 6 in the top sub 1. The slip 3 is then compressed by the ramp 6, causing teeth 7 of the slip to bite into the coiled tubing. The bottom sub 2 provides a connection to the top sub 1, and also a connection to attach to the tool string below. Variations on the prior connector shown in FIG. 12 are disclosed in U.S. Pat. No. 5,348,088, US patent publication no. US-2009/0278348A1 and International Patent Publication no. WO-02/46653.

These types of connectors are limited with regard to the axial load that they can withstand, as they only have a single ramp face. Depending upon factors including the connector outer diameter, the coiled tubing outer diameter and the ramp angle, this limits the maximum possible length of the slip. The shorter the slip, the greater is the chance of the coiled tubing collapsing under the load imparted by the slip, and of the connector pulling off the coiled tubing.

Other known types of connector have multiple ramps, or a helical ramp which serves to spread the load. Two such connectors are disclosed in US patent publication no. US-2011/0248495A1 and U.S. Pat. No. 2,346,051. However, connectors of this type need to be rotated in, and/or involve multiple components and are complicated to assemble. Helical ramps can also perform poorly in situations where the connector experiences torque during use, for example when being run in conjunction with a downhole motor. This is because the connector can be prone to lose its grip with the coiled tubing if the motor stalls, due to the resultant torque.

In particular, helical slip type connectors can let go' (release) as a result of stall torque. As is well known, a downhole motor produces torque while milling. If the motor takes a 'bind' and stalls, the torque is transferred to the coiled tubing above. When the Bottom Hole Assembly (BHA) including the motor is subsequently picked up, the torque is released and the mass of the tool string below the connector produces a twisting or turning moment. In some cases, that can be enough for the connector to back-off and release the coiled tubing, which is sometimes referred to by operations engineers as 'reactive torque'.

According to a first aspect of the present invention, there is provided a connector for connecting a first wellbore tubular to a second wellbore tubular, the connector comprising:

a tubular housing having an internal bore which receives the first wellbore tubular, the tubular housing being connectable to the second wellbore tubular and comprising an internal surface which faces the internal bore and a ramp assembly arranged around the internal surface, the ramp assembly comprising:
a plurality of elongate ramp arrays, each ramp array comprising a plurality of ramps which are inclined towards the internal bore; and
a plurality of elongate channels which are arranged relative to the ramp arrays so that arrays which are adjacent are separated by an elongate channel;

a slip body which is insertable into the internal bore of the tubular housing, the slip body comprising an internal passage which receives the first wellbore tubular, an internal surface which faces the internal passage and which comprises at least one slip tooth for engaging the tubular, an external surface and a ramp assembly arranged around the external surface, the ramp assembly comprising:
a plurality of elongate ramp arrays, each ramp array comprising a plurality of ramps which are inclined away from the slip body, the ramp arrays of the slip body adapted to cooperate with the ramp arrays of the tubular housing to cause said slip tooth to grip the first wellbore tubular; and a plurality of elongate channels which are arranged relative to the ramp arrays so that arrays which are adjacent are separated by an elongate channel;

in which the elongate ramp arrays of the slip body are each alignable with a respective elongate channel of the tubular housing, so that the slip body can be inserted into the tubular housing;

and in which the slip body is rotatable within the tubular housing, so that the ramp arrays of the slip body can each be brought into alignment with a respective ramp array of the tubular housing.

The first and second wellbore tubulars may be any suitable tubulars that are capable of being deployed into a well. The first tubular may be a coiled tubing, and the connector may be a coiled tubing connector for connecting a coiled tubing to the second wellbore tubular. The second tubular may form part of a tubing string comprising a plurality of tubulars coupled together end-to-end. The second tubular may be coupled, directly or indirectly, to a tool or equipment adapted to be located in the well to perform a wellbore function, for example an intervention tool for performing an intervention procedure, a drilling tool or a milling tool (either of which may comprise a downhole motor). However, a wide range of different tools, including ones that are not specifically for performing an intervention, drilling or milling procedure, may be deployed using the second tubular. The second tubular may be or may form part of a tool string. The second tubular may form part of the tool or equipment adapted to be located in the well.

The provision of ramp assemblies comprising ramp arrays having a plurality of ramps on each of the tubular housing and slip body may provide a more secure grip of the first wellbore tubular than in prior connectors of the type comprising a single ramp. In particular, the provision of a plurality of ramps (in each ramp array) may enable an overall length of the ramp assembly of the housing to be greater than that provided in prior connectors. In cooperation with the ramps of the ramp arrays provided on the slip body, this may provide a gripping action over a longer length of the first tubular. Also, the inclination of the ramps (a ramp angle of the ramps) may be greater than in prior connectors, providing an improved gripping effect, as the slip teeth may be urged radially inwardly to a greater extent for a corresponding axial movement of the slip body, when compared to prior connectors. Such may be achieved without detriment to the length of tubular which can be gripped, due to the provision of multiple ramps in each ramp array.

The provision of the elongate ramp arrays and channels on the slip body and the tubular housing, arranged as described above, may facilitate insertion of the slip body into the housing. Specifically, insertion of the slip body into the tubular housing may be achieved by orienting the slip body so that its ramp arrays are rotationally aligned with the elongate channels of the housing, and then translating the slip body relative to the housing so that the ramp arrays pass into the channels. The ramp arrays of the slip body may then be brought into cooperation with the ramp arrays of the housing by rotating the slip body relative to the housing, suitably about a longitudinal axis of the slip body (which may be coaxial with a longitudinal axis of the tubular housing).

The slip body may be rotatable within the tubular housing so that the elongate channels of the slip body can each be brought into alignment with a respective elongate channel of the tubular housing.

The connector may further comprise a locking body, the locking body comprising a plurality of elongate locking elements. Each locking element may be locatable in a respective one of the aligned channels of the tubular housing and the slip body, to lock the slip body against further rotation within the tubular housing.

The locking body may act to prevent rotation of the slip body within the tubular housing following alignment of the respective ramp arrays. This may prevent movement of the ramp arrays out of cooperation, and so inadvertent release of the first tubular from the connector. Release of the first tubular from the connector may therefore require that the locking body first be released/removed from the housing. The locking body may therefore act to prevent inadvertent release of the connector from the first tubular, for example in situations where the connector experiences torque (such as where the second tubular comprises or is coupled to a downhole motor, particularly in the event of the motor stalling).

Each locking element may be dimensioned so that it at least closes the elongate channel of the slip body, but may close off the aligned channels and so at least part of the tubular housing elongate channel as well. The locking body may comprise a collar, which may define an opening that receives the first wellbore tubular, the locking elements extending from the collar. The locking elements may be arms or fingers. The locking elements may define a maximum width. The elongate channels of the tubular housing may define a minimum width. The elongate channels of the slip body may define a minimum width. The minimum widths of the tubular housing and slip body elongate channels may be greater than the maximum width of the locking elements. This may facilitate insertion and removal of the locking body. The locking elements may each have an inner surface, which may together describe a minimum inner diameter. The elongate channels of the slip body may each comprise a base, which may together describe a maximum outer diameter. The minimum inner diameter described by the locking element inner surfaces may be greater than the maximum outer diameter described by the slip body bases. The ramp arrays of the slip body may together describe a maximum outer diameter, which may be greater than the minimum inner diameter described by the locking element inner surfaces.

The ramp assembly of the tubular housing may be arranged around a perimeter of the tubular housing, which may be a perimeter of the internal surface, and which may be a circumference. The plurality of elongate channels of the tubular housing may be arranged relative to the ramp arrays so that arrays which are adjacent, in a direction around the perimeter of the housing, are separated by the elongate channel. The ramp arrays may be spaced apart around the perimeter of the housing. The elongate channels may be spaced apart around the perimeter of the housing. The elongate channels may alternate between the ramp arrays, in a direction around the perimeter.

The ramp assembly of the slip body may be arranged around a perimeter of the body, which may be a perimeter of the external surface and which may be a circumference. The plurality of elongate channels may be arranged relative to the ramp arrays so that arrays which are adjacent, in a direction around the perimeter of the body, are separated by the elongate channel. The ramp arrays may be spaced apart around the perimeter of the body. The elongate channels may be spaced apart around the perimeter of the body. The elongate channels may alternate between the ramp arrays, in a direction around the perimeter.

The ability of the slip body to be rotated within the tubular housing may facilitate alignment of the ramp arrays of the slip body with the ramp arrays of the tubular housing. Such alignment may only occur following insertion of the slip body into the housing, with the slip body ramp arrays aligned with the elongate channels of the housing.

The connector may be selectively actuable to cause said slip tooth to grip the first wellbore tubular. The connector may comprise an actuating body which is adapted to translate the tubular housing relative to the slip body (or vice-versa), to cause said slip tooth to grip the first tubular. The actuating body may be rotatable relative to the tubular housing to translate the housing. The tubular housing may define a first part of a threaded connection, and the actuating body a second part of a threaded connection, engagement of the first and second parts causing translation of the housing relative to the slip body. The tubular housing and the actuating body may both be tubular, and may be tubular subs (which may be relatively short length tubulars). The actuating body may comprise a first part of a further threaded connection, for connecting to the second tubular, suitably to a second part of the threaded connection on or provided by the second tubular. The connector may comprise a pin for securing the actuating body against further rotation relative to the tubular housing, which may be a set screw. The actuating body may define a shoulder which is locatable within the internal bore of the tubular housing, and which may be adapted to abut the first wellbore tubular. The shoulder may limit an extent to which the first wellbore tubular can be inserted into the tubular housing.

The tubular housing may comprise a first end which receives the first wellbore tubular. The tubular housing may comprise a second end which is connectable to the second wellbore tubular. The slip body may have a first end, which may be disposed, in use, closer to the first end of the tubular housing; and a second end, which may be disposed, in use, further away from the first end of the tubular housing, and which may be closer to the second end of the housing. The tubular housing may comprise a shoulder which is adapted to abut an end of the slip body, optionally the second end, to restrict an extent to which the slip body can be inserted into the tubular housing.

The ramps of the slip body may each have a first end disposed closer to the first end of the slip body, and a second end disposed closer to the second end of the slip body. The ramps of the slip body may be inclined (or tapered, which term may be used interchangeably with inclined) so that they describe a maximum outer diameter (of the slip body) at or adjacent to their second ends, and so that they describe a minimum outer diameter (of the slip body) at or adjacent their first ends. The ramps of the slip body may each comprise a ramp surface, which may be inclined relative to a longitudinal axis of the slip body. The ramp surfaces may describe ramp angles which are substantially constant.

The ramps of the tubular housing may each have a first end disposed closer to the first end of the housing, and a second end disposed closer to the second end of the housing. The ramps of the housing may be inclined (or tapered, which term may be used interchangeably with inclined) so that they describe a maximum inner diameter (of the housing) at or adjacent to their second ends, and so that they describe a minimum inner diameter (of the housing) at or adjacent their first ends. The ramps of the tubular housing may each comprise a ramp surface, which may be inclined relative to a longitudinal axis of the housing. The ramp surfaces may describe ramp angles which are substantially constant. The maximum inner diameter defined by the housing ramps may be (slightly) greater than the maximum outer diameter defined by the slip body ramps. The minimum inner diameter defined by the housing ramps may be (slightly) greater than the minimum outer diameter defined by the slip body ramps. This may facilitate rotation of the slip body to bring the ramp arrays into alignment.

When the ramp arrays of the slip body are aligned with the ramp arrays of the tubular housing, the ramp surfaces of the slip body ramp arrays may be disposed opposite/adjacent to a respective ramp surface of the tubular housing ramp arrays. The ramp surfaces may be closely spaced and optionally may be in abutment. Axial translation of the tubular housing relative to the slip body may then cause the slip body ramps (and so the slip body) to be urged inwardly, suitably radially inwardly, to cause said slip tooth to grip the first wellbore tubular.

The ramp arrays of the tubular housing may define a ramp profile, which may comprise a shape, dimensions and/or positioning of the ramps. The ramp arrays of the slip body may define a ramp profile, which may comprise a shape, dimensions and/or positioning of the ramps. The ramp profiles of the tubular housing and of the slip body may substantially mirror one another (and so may be mirror images of one another) so that they fit together and align, which may facilitate gripping of the first wellbore tubular.

The ramp arrays of the slip body may comprise a longitudinal axis, which may extend substantially parallel to a longitudinal axis of the slip body. The elongate channels of the slip body may comprise a longitudinal axis, which may extend substantially parallel to a longitudinal axis of the slip body. The ramps of the ramp array may be disposed spaced apart along a length of the ramp array. The ramps may be arranged sequentially along a length of the ramp array.

The ramp arrays of the tubular housing may comprise a longitudinal axis, which may extend substantially parallel to a longitudinal axis of the housing. The elongate channels of the tubular housing may comprise a longitudinal axis, which may extend substantially parallel to a longitudinal axis of the housing. The ramps of the ramp array may be disposed spaced apart along a length of the ramp array. The ramps may be arranged sequentially along a length of the ramp array.

The tubular housing may comprise any suitable number of ramp arrays and elongate channels. The ramp arrays may be equally spaced apart around the perimeter of the tubular housing. The elongate channels may be equally spaced apart around the perimeter of the tubular housing. The tubular housing may comprise at least three, at least four, at least six, at least eight, and optionally more than eight ramp arrays and elongate channels. Any number between three and eight may be chosen, and optionally more than eight.

The slip body may comprise a wall, and an elongate slot which may extend through the wall and along a length of the body. The elongate slot may facilitate radial expansion and contraction of the slip body. Expansion may occur when the slip body is fitted around the first wellbore tubular. Contraction may occur when the ramp arrays on the slip body and on the tubular housing cooperate to cause said slip tooth to grip the wellbore tubular. The elongate slot may comprise a longitudinal axis, which may extend substantially parallel to a longitudinal axis of the slip body. The elongate slot may align with a ramp array of the tubular housing when the slip body is inserted into the housing. The elongate slot may align with an elongate channel of the tubular housing, when the slip body is rotated to align the elongate channels of the slip body with the elongate channels of the tubular housing. The wall of the slip body may define the internal surface and the external surface of the body. The slot may extend through the slip body from the internal surface to the external surface. The slip body may be substantially C-shaped. The internal surface of the slip body may define the internal passage. In use, when the slip body is located within the tubular housing, the slip body may be located between the internal surface of the tubular housing and an external surface of the first wellbore tubular. Said slip tooth may grip an external surface of the first wellbore tubular.

The slip body may comprise any suitable number of ramp arrays and elongate channels. The ramp arrays may be equally spaced apart around the perimeter of the slip body. The elongate channels may be equally spaced apart around the perimeter of the slip body. The slip body may comprise at least three, at least four, at least six, at least eight, and optionally more than eight ramp arrays. Any number between three and eight may be chosen, optionally more than eight. The number of elongate channels defined by the slip body may be one less than the number of ramp arrays, particularly where the slip body comprises an elongate slot (although the slot may be considered to effectively form an elongate channel).

The connector may comprise a single slip body defining all of the ramp arrays and elongate channels. The connector may comprise a plurality of slip bodies, each slip body defining a plurality of ramp arrays and at least one elongate channel. Where there are a plurality of slip bodies, the slip bodies may cooperate on rotation, for alignment of ramp arrays of the slip bodies with ramp arrays of the tubular housing.

The elongate channels of the tubular housing may describe a minimum width. The ramp arrays of the slip body may define a maximum width. The minimum width of the tubular housing elongate channels may be greater than the maximum width of the slip body ramp arrays. This may facilitate insertion of the slip body into the tubular housing, and removal of the slip body from the housing.

The slip body, in particular the at least one slip tooth of the body, may describe a minimum internal diameter which, in at least a rest state of the slip body (prior to alignment of the slip body ramp assemblies with the tubular housing ramp assemblies), may be less than an external diameter of the first wellbore tubular. This may provide an interference fit with the first tubular, which may in turn provide an initial grip of the tubular, prior to alignment of ramp assemblies and actuation of the connector. The initial grip that is thereby provided may facilitate subsequent actuation of the connector, by restricting axial translation of the slip body relative to the first wellbore tubular when the actuating body is rotated relative to the tubular housing.

The tubular housing may comprise a locking feature, such as an aperture, extending through a wall of the housing. The slip body may comprise a locking feature, such as an aperture, extending through or into a wall of the body. The locking apertures may be in alignment when the slip body is rotated into a position in which its ramp arrays are aligned with the ramp arrays of the tubular housing. The connector may comprise a locking component, which may be a pin, such as a set screw, and which may be locatable in the aligned apertures. The locking aperture of the slip body may be elongate, in a direction taken along a length of the slip body, and may be generally oval in shape. This may provide a degree of axial play in the position of the slip body relative to the tubular housing, which may enable the gripping force to be imparted on the first wellbore tubular, by translation of the tubular housing relative to the slip body (the ramp arrays on the housing and the body then cooperating to urge said slip teeth inwardly to grip the first wellbore tubular). The locking pin may prevent further rotation of the slip body relative to the housing (optionally as a backup, separate to the locking elements of the locking body). The locking body may comprise a locking aperture, which may extend completely through or only part way (for example a blind bore) through a wall of a locking element of the locking body. The locking aperture of the locking body may align with the locking apertures of the slip body and the tubular housing, when the slip body is rotated into a position in which its ramp arrays are aligned with the ramp arrays of the tubular housing. The locking pin may pass through the tubular housing and slip body apertures and into the locking body aperture.

The slip body will typically comprise a plurality of slip teeth, suitably more than two. The at least one slip tooth may extend at least part way around a perimeter of the slip body internal surface, which may be a circumference. The at least one slip tooth may be disposed perpendicular to a longitudinal axis of the slip body (parallel to the circumference of the body), or may be inclined, for example extending along a helical path around the internal surface of the body. The at least one slip tooth may taper towards a peak which is adapted to bite into the external surface of the first wellbore tubular.

According to a second aspect of the present invention, there is provided a method of connecting a first wellbore tubular to a second wellbore tubular using a connector comprising:

a tubular housing having an internal bore, an internal surface which faces the internal bore and a ramp assembly arranged around the internal surface, the ramp assembly comprising:
        a plurality of elongate ramp arrays, each ramp array comprising a plurality of ramps which are inclined towards the internal bore; and
        a plurality of elongate channels which are arranged relative to the ramp arrays so that arrays which are adjacent are separated by an elongate channel;
    a slip body comprising an internal passage, an internal surface which faces the internal passage and which comprises at least one slip tooth, an external surface and a ramp assembly arranged around the external surface, the ramp assembly comprising:
        a plurality of elongate ramp arrays, each ramp array comprising a plurality of ramps which are inclined away from the slip body; and
        a plurality of elongate channels which are arranged relative to the ramp arrays so that arrays which are adjacent are separated by an elongate channel;
    in which the method comprises the steps of:
    aligning each elongate ramp array of the slip body with a respective elongate channel of the tubular housing, and inserting the slip body into the tubular housing so that said ramp arrays are located in said channels;
    rotating the slip body within the tubular housing, to bring each of the ramp arrays of the slip body into alignment with a respective ramp array of the tubular housing;
    locating a first wellbore tubular within the internal bore of the tubular housing, the wellbore tubular passing along the internal passage of the slip body so that the slip body is located between the internal surface of the tubular housing and an external surface of the wellbore tubular;
    actuating the connector so that the ramp arrays of the slip body cooperate with the ramp arrays of the tubular housing, to cause said slip tooth to grip the first wellbore tubular; and connecting the tubular housing to the second wellbore tubular.

Further features of the method of the second aspect of the invention may be derived from the text set out elsewhere in this document, in particular in or with reference to the first aspect of the invention.

According to a third aspect of the present invention, there is provided a wellbore tubing assembly comprising a first wellbore tubular, a second wellbore tubular, and a connector according to the first aspect of the invention for connecting the first wellbore tubular to the second wellbore tubular.

Further features of the first and second wellbore tubulars and/or of the connector of the third aspect of the invention may be derived from the text set out elsewhere in this document, in particular in or with reference to the first aspect of the invention.

Embodiments of the present invention will now be described, with reference to the accompanying drawings, in which:

FIG. 5 is an end view of the slip body shown in FIG. 4;

FIG. 6 is an end view of the tubular housing shown in FIG. 4;

FIG. 7 is an end view of the slip body and tubular housing, the slip body shown inserted within the tubular housing;

FIG. 8 is a view corresponding to FIG. 7, showing the slip body following rotation to bring ramp arrays of the body into alignment with ramp arrays of the housing;

Figure 1:
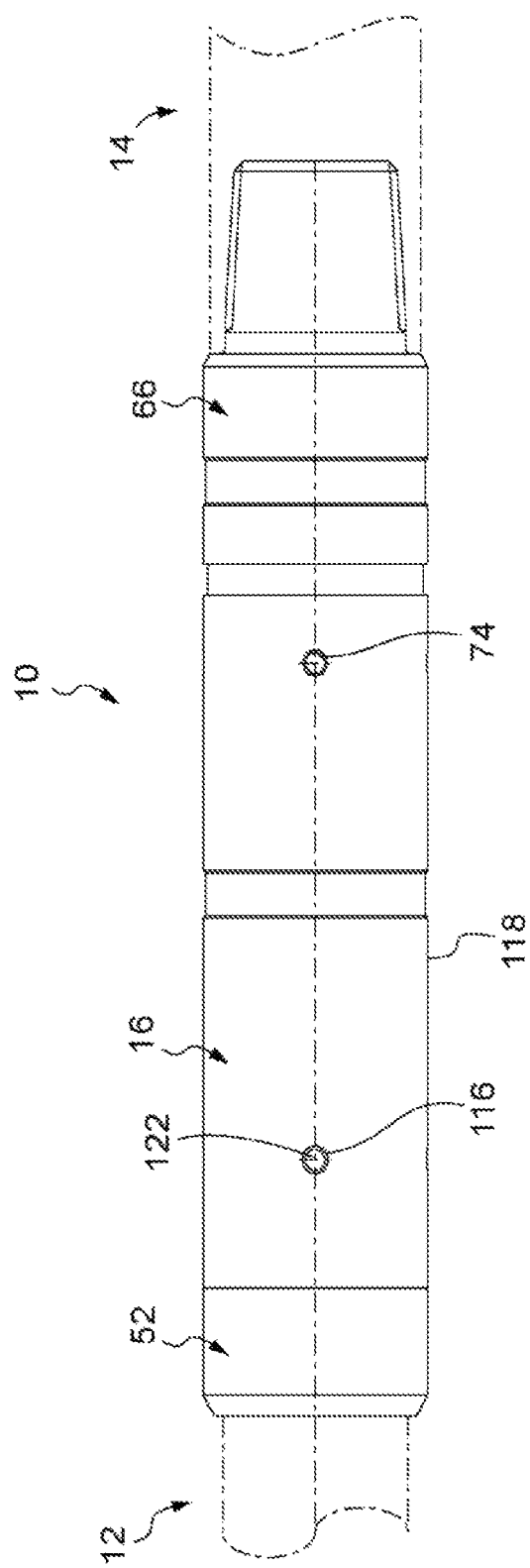
FIG. 1 is a side view of a connector for connecting a first wellbore tubular to a second wellbore tubular, in accordance with an embodiment of the present invention.

Turning firstly to FIG. 1, there is shown a side view of a connector for connecting a first wellbore tubular to a second wellbore tubular, in accordance with an embodiment of the present invention, the connector indicated generally by reference numeral 10. The first and second wellbore tubulars are shown in broken outline in the drawing, and indicated respectively by reference numerals 12 and 14. The wellbore tubulars 12 and 14 can be any suitable tubulars that are capable of being deployed into a well. In the illustrated embodiment, the first wellbore tubular 12 takes the form of a coiled tubing, and so the connector 10 takes the form of a coiled tubing connector. The second wellbore tubular 14 takes the form of a tool string comprising a number of lengths of tubing which are coupled together end-to-end, and which carries a tool or equipment for performing an operation in the well (not shown). The tool may be an intervention tool, a drilling tool or a milling tool. However, a wide range of different tools may be deployed using the tool string 14.

The connector 10 is shown in an assembled state in FIG. 1, in which it has been securely connected to the first wellbore tubular 12 and to the second wellbore tubular 14.

Figure 2:
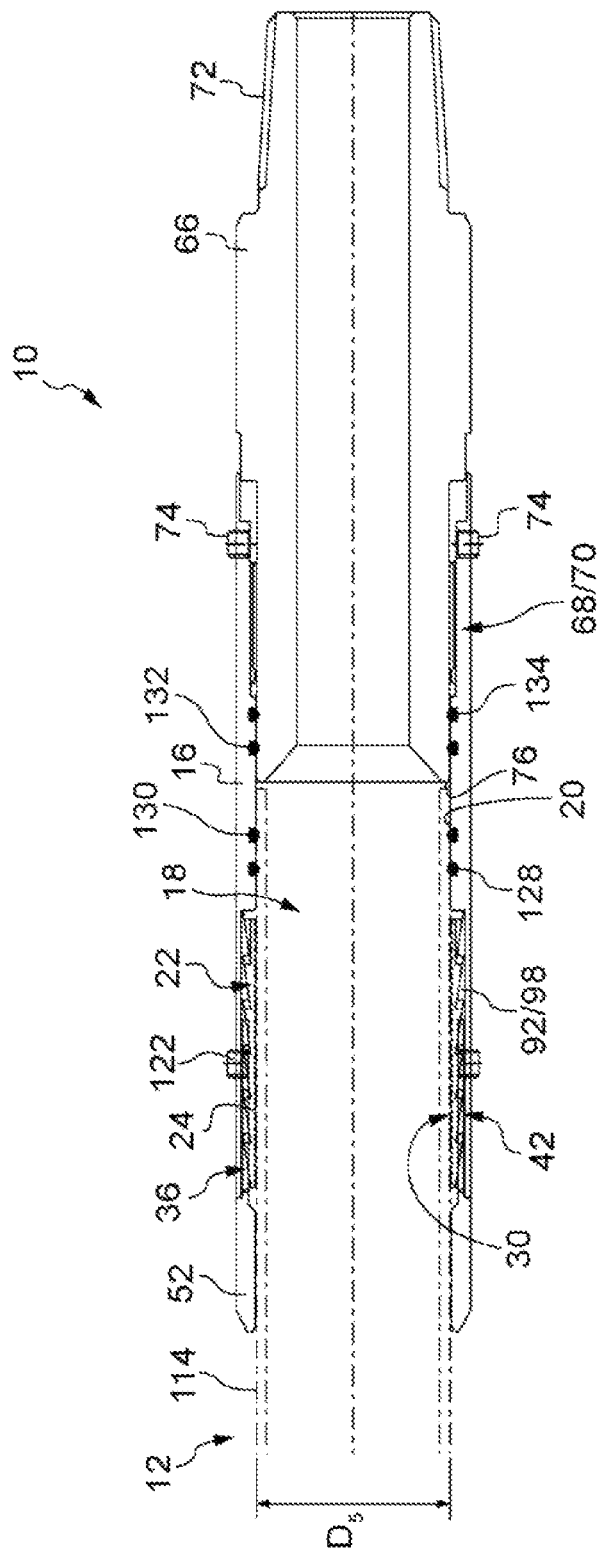
FIG. 2 is a longitudinal cross-sectional view of the connector of FIG. 1, shown in an initial position or stage.

FIG. 2 is a longitudinal cross-sectional view of the connector 10, showing it prior to having been fully actuated to secure it to the tubular 12 (coiled tubing), and prior to connection of the second tubular 14 (tool string).

The connector 10 generally comprises a tubular housing 16 having an internal bore which receives the first wellbore tubular 12, and which is connectable to the second wellbore tubular 14. The housing 16 also comprises an internal surface 20 which faces the internal bore 18, and a ramp assembly 22 which is arranged around the internal surface, as best shown in the exploded longitudinal sectional view of FIG. 3 (which is drawn to a different scale from FIG. 2).

The connector 10 also comprises a slip body 24 which is insertable into the internal bore 18 of the housing 16, and which comprises an internal passage 26 that receives the first wellbore tubular 12, an internal surface 28 which faces the internal passage 26 and which comprises at least one slip tooth 30 for engaging the wellbore tubular 12, an external surface 32 and a ramp assembly 34 arranged around the external surface. In the illustrated embodiment, the slip body 24 comprises a plurality or series of slip teeth 30, which each extend around at least part of a circumference of the internal surface 28, perpendicular to a longitudinal axis 50 of the slip body (and parallel to the circumference). However, the slip teeth 30 may be inclined, for example extending along a helical path around the internal surface 28 of the slip body 24. The slip teeth 30 each taper towards a peak, which assists in engaging the first wellbore tubular 12.

Figure 4:
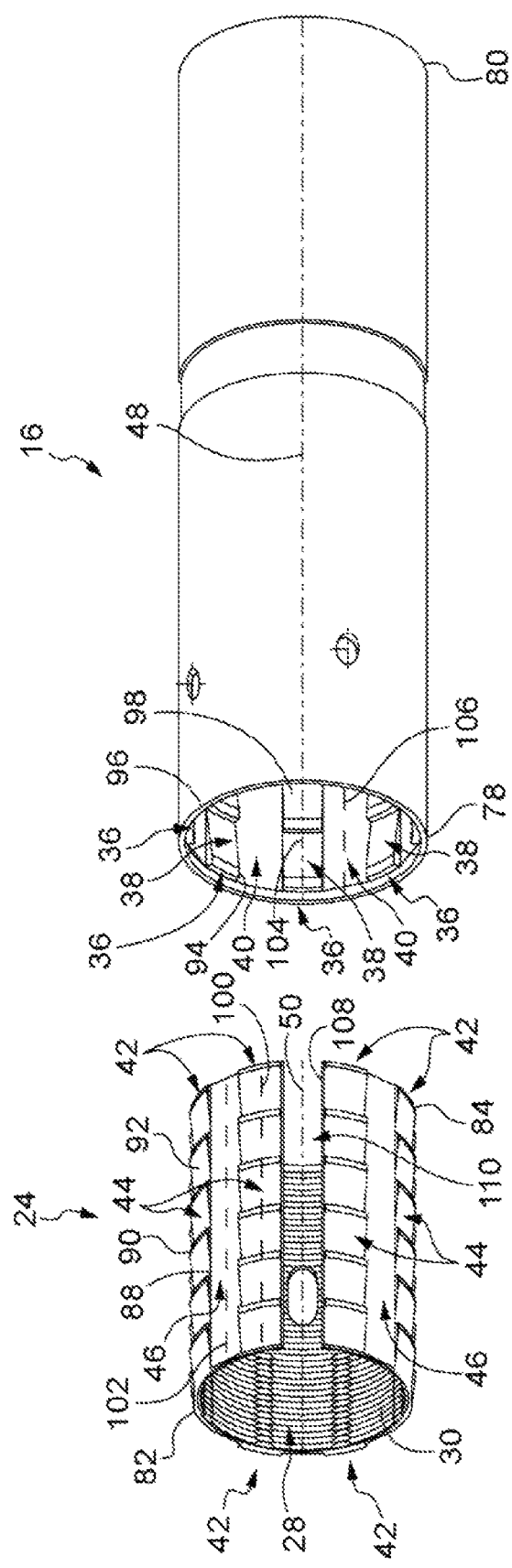
FIG. 4 is a perspective view of a tubular housing and slip body forming part of the connector of FIG. 1.

The ramp assembly 22 of the housing 16 comprises a plurality of elongate ramp arrays 36, each of which comprises a plurality of ramps 38 that are inclined towards the internal bore 18. The ramp arrays 36 also comprise a plurality of elongate channels 40 which are arranged relative to the ramp arrays 36 so that arrays which are adjacent are separated by an elongate channel. This is best shown in the enlarged perspective view of FIG. 4, which shows the housing 16 and the slip body 24 separated from one another, and which is drawn to the same scale as FIG. 2. The arrangement of the ramp arrays 36 and channels 40 can clearly be seen in the drawing. The ramp assembly 34 of the slip body 24 is best shown in FIG. 4, and comprises a plurality of elongate ramp arrays 42, each ramp array comprising a plurality of ramps 44 which are inclined away from the slip body 24, and which are adapted to cooperate with the ramp arrays 36 of the housing 16, to cause the slip tooth 30 to grip the first wellbore tubular 12. In addition, a plurality of elongate channels 46 are arranged relative to the ramp arrays 42, so that arrays which are adjacent are separated by an elongate channel. The arrangement of ramp assemblies and elongate channels on the slip body 24 and housing 16 is also shown in the end views of FIGS. 5 and 6, respectively.

As mentioned above, the slip body 24 is insertable into the internal bore 18 of the housing 16. This is achieved by aligning each of the ramp arrays 42 of the slip body 24 with a respective elongate channel 40 of the housing 60, as shown in FIG. 7. As can be understood by comparing FIGS. 2, 4 and 7, when the ramp arrays 42 and channels 40 are aligned in this way, the slip body 24 can be inserted into the housing 16 by translating the slip body in a direction along a longitudinal axis 48 of the housing 16 (FIG. 4), without relative rotation between the slip body 24 and the housing.

When the slip body 24 has been fully inserted into the housing 16, the slip body is rotated within the housing so that the ramp arrays 42 of the slip body are each brought into alignment with a respective ramp array 36 of the housing, as shown in FIG. 8. In addition, in this rotational orientation of the slip body 24, the elongate channels 46 of the slip body 26 are each aligned with a respective elongate channel 40 of the housing 16 ramp assembly 34.

This arrangement of the ramp arrays 36, 42 and the channels 40, 46 facilitates insertion of the slip body 24 into the housing 16. Specifically, insertion of the slip body 24 into the housing 16 is achieved by orienting the slip body so that its ramp arrays 42 are rotationally aligned with the elongate channels 40 of the housing 16, each ramp array aligned with a respective channel. The slip body 24 is then translated relative to the housing so that the ramp arrays 42 pass into the channels 40. The ramp arrays 42 of the slip body 24 are then brought into cooperation with the ramp arrays 36 of the housing 16 by rotating the slip body relative to the housing, about the longitudinal axis 50 of the slip body (FIG. 4) which is coaxially located with the longitudinal axis 48 of the housing 16.

In the illustrated embodiment, the slip body 24 comprises eight ramp arrays 42 which are equally spaced apart around a circumference of the slip body, and the housing 16 correspondingly comprises eight ramp arrays 36 which are equally spaced apart around a circumference of the housing, and eight equally spaced elongate channels 40. The ramp arrays 42 on the slip body 24 are therefore brought into alignment with the ramp arrays 36 on the housing 16 by a ⅛$^{th}$ turn of the slip body 24 relative to the housing 16. As will be described in more detail below, the housing 16 is then axially translated relative to the slip body 24, the ramp arrays 36 on the housing 16 cooperating with the ramp arrays 42 on the slip body 24 to urge the slip teeth 30 on the slip body radially inwardly to grip the first wellbore tubular 12.

Figure 9:
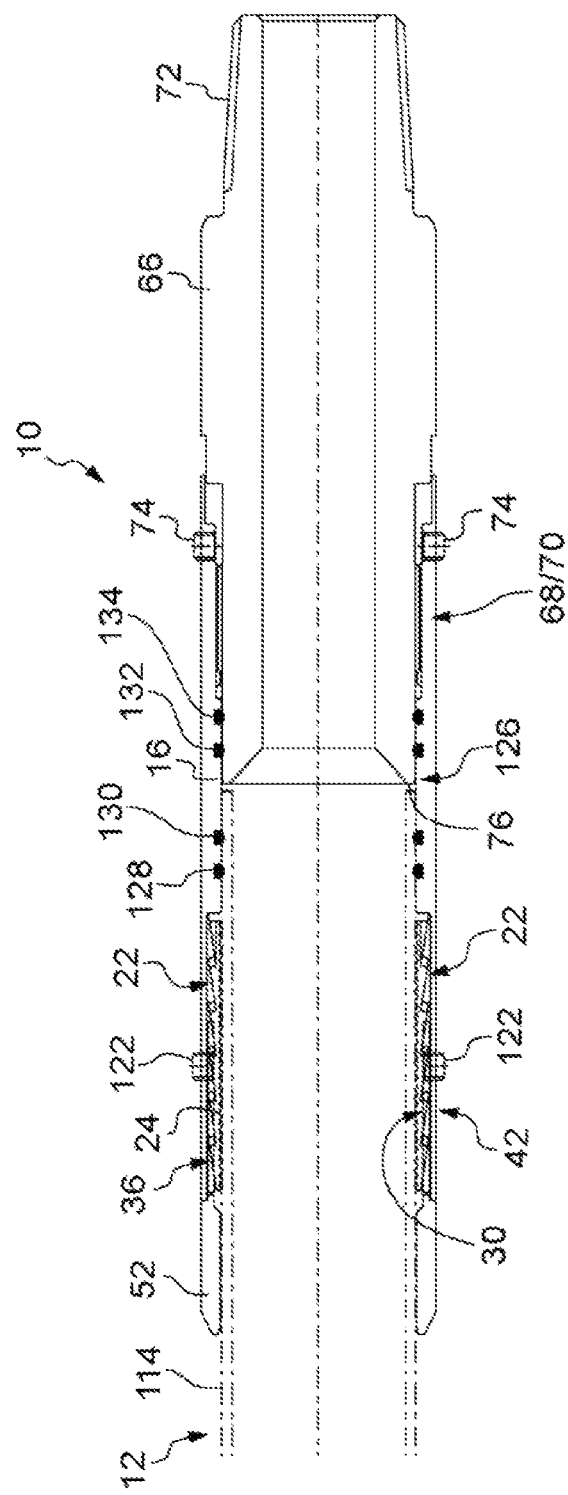
FIGS. 9 and 10 are view of the connector which correspond to that of FIG. 2, but showing the connector at different stages in its actuation to grip the first wellbore tubular and to connect the first wellbore tubular to the second wellbore tubular.

The connector 10 and its method of operation will now be described in more detail, with reference also to FIGS. 9 and 10, which are longitudinal cross-sectional views of the connector similar to FIG. 2, but showing further stages in a procedure to operate the connector.

The connector 10 comprises a locking body 52, which comprises a plurality of elongate locking elements 54 in the form of locking arms or fingers. The locking body 52 is shown separately in the longitudinal sectional view of FIG. 11. Each one of the locking elements 54 is locatable in a respective one of the aligned channels 40 and 46 of the housing 16 and the slip body 24, to lock the slip body against further rotation within the tubular housing. Such alignment of the channels 40 and 46 is shown in FIG. 8. When the channels are oriented in this way, the locking body 52 can be inserted into the housing 16, each one of the locking elements 54 passing along one of the sets of aligned channels 40 and 46, so that the locking body is in the position shown in FIG. 2.

The locking body 24 acts to prevent rotation of the slip body 24 within the housing 16 following alignment of the ramp arrays 36 and 42. This prevents movement of the ramp arrays out of cooperation (i.e. movement away from their aligned position shown in FIG. 8), and so inadvertent release of the first wellbore tubular 12 from the connector 10. Release of the first wellbore tubular 12 from the connector 10 therefore requires that the locking body 52 first be released from the housing 16. This is of particular use for situations in which the connector 10 is exposed to torque, such as where the second wellbore tubular 14 comprises a downhole motor. As discussed above, in the event that the motor stalls, a reactive torque that occurs when the BHA including the motor is subsequently picked up could otherwise cause the connector 10 to back-off and release the first wellbore tubular 12.

Each locking element 54 is dimensioned so that it closes the elongate channel 46 of the slip body 24 that it is inserted into. Typically however the locking elements 54 are each dimensioned so that they close the aligned channels 40 and 46 of the housing 16 and the slip body 24. It will be understood that, when the locking elements 54 are located in the aligned channels 40 and 46, the locking elements effectively block the channels and so prevent rotation of the slip body 24 relative to the housing 16 back to its starting (insertion) position of FIG. 7.

The locking body 52 comprises a collar 56 which defines an opening 58, and a bore 60 that receives the first wellbore tubular 12. The locking elements 54 each extend from the collar 56, and are typically provided integrally with the collar 56. However, in a variation on the illustrated embodiment, the locking elements 54 may be provided separately and connected to the collar 56.

Figure 11:
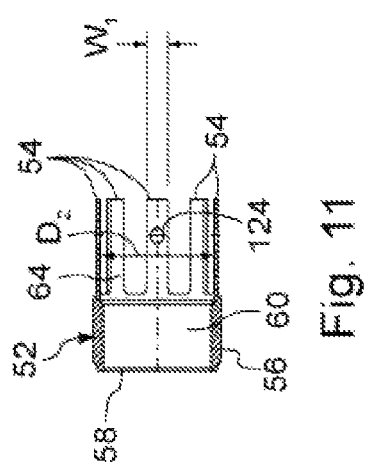
FIG. 11 is a longitudinal cross-sectional view of a locking body of the connector shown in FIG. 1.
Figure 12:
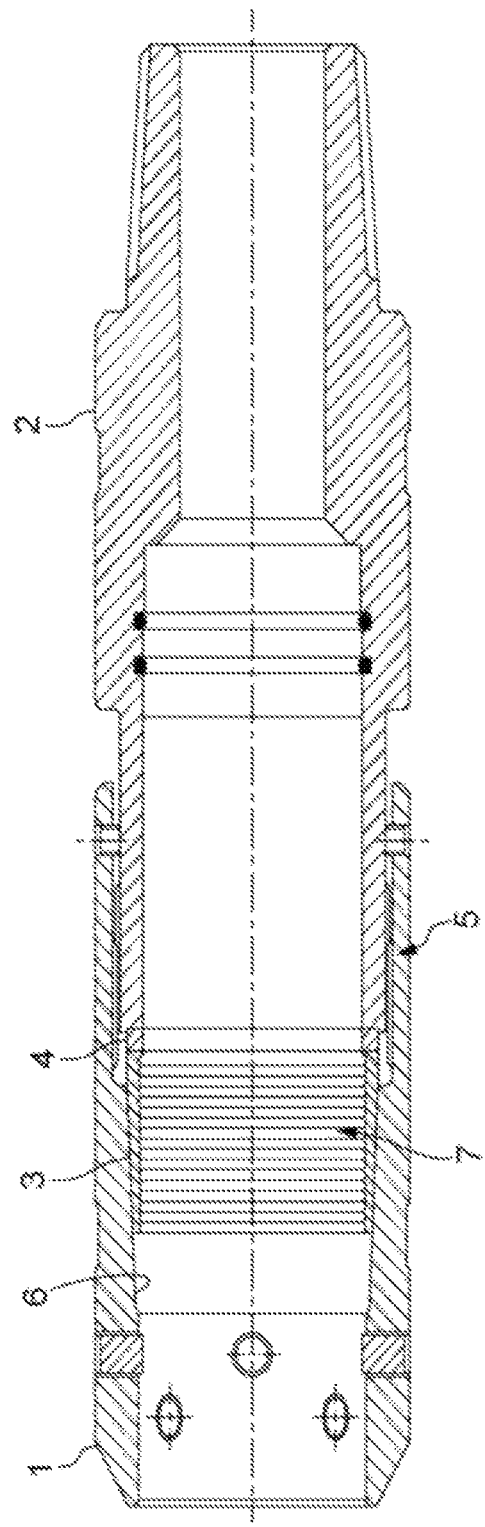
FIG. 12 is a longitudinal cross-sectional view of a prior connector.

The locking elements 54 each define a maximum width $W_1$ (FIG. 11), measured in a direction parallel to a tangent. The elongate channels 40 of the housing 16 also define a minimum width $W_2$ (FIG. 6), and the elongate channels 46 of the slip body 24 a minimum width $W_3$ (FIG. 5), again measured in directions parallel to tangents. The minimum widths $W_2$ of the housing channels 40, and the minimum widths $W_3$ of the slip body channels 46, are greater than the maximum width $W_1$ of the locking elements 54. It should be noted here that the locking body 52 is drawn to a different scale in FIG. 11, compared to the housing 16 and slip body 24 in FIGS. 7 and 5 respectively. This arrangement of channel and locking element widths facilitates insertion of the locking elements 54 of the locking body 52 into the housing 16, to secure the slip body 24 against rotation.

The elongate channels 46 of the slip body 24 each comprise bases 61, which together describe an outer diameter $D_1$ (FIG. 8). The locking elements 54 of the locking body 52 each have inner surfaces 64 (FIG. 11), which together describe an inner diameter $D_2$. The inner diameter $D_2$ described by the locking element inner surfaces 64 is greater than the outer diameter $D_1$ described by the slip body channel bases 61. This facilitates insertion of the locking elements 54 along the respective channels 46 of the slip body 24. In addition, the ramp arrays 42 of the slip body 24 together describe a maximum outer diameter $D_3$ (FIG. 5), which is greater than the minimum inner diameter $D_2$ described by the locking element inner surfaces 64. In this way, rotation of the slip body 24 back to the position shown in FIG. 7 is prevented when the locking body is coupled to the housing 16 with the locking elements 54 located in the aligned channels 40 and 46.

Figure 3:
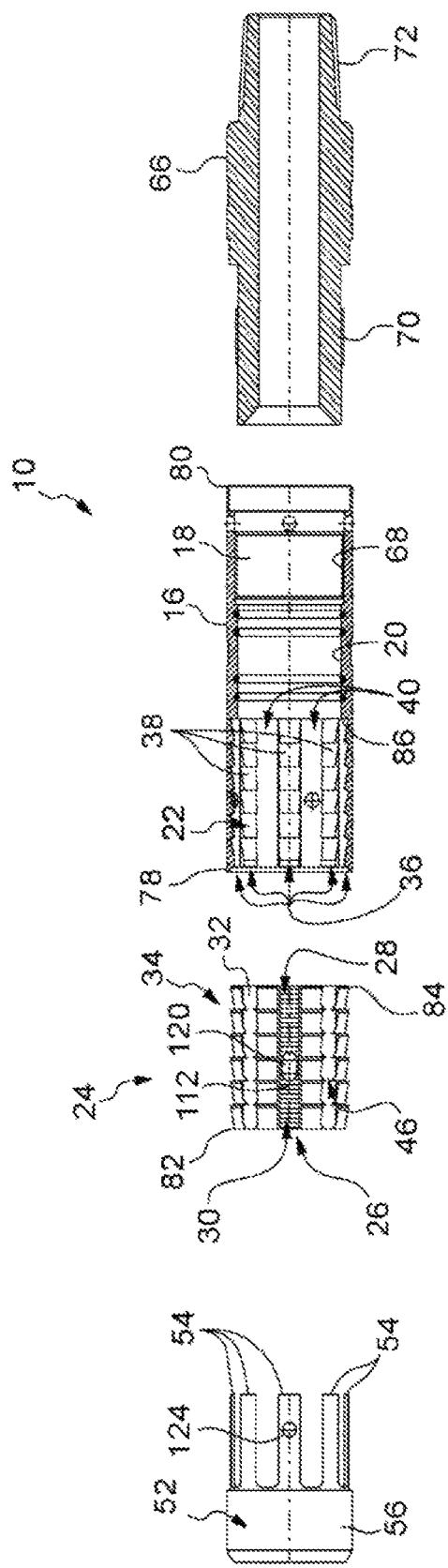
FIG. 3 is a partial longitudinal cross-sectional exploded view of the connector shown in FIG. 1.

As shown in the sectional view of FIG. 3, the ramp assembly 22 of the tubular housing 16 is arranged around a perimeter of the housing, which in the illustrated embodiment is a circumference of the internal surface 20. The elongate channels 40 are arranged relative to the ramp arrays 36 so that arrays which are adjacent, in a direction around the circumference of the housing, are separated by an elongate channel. The elongate channels 40 effectively alternate between the ramp arrays 36, in a direction around the circumference.

In a similar way, the ramp assembly 34 of the slip body 24 is arranged around a perimeter of the body, which in the illustrated embodiment is a circumference of the external surface 32. The elongate channels 46 are arranged relative to the ramp arrays 42 so that arrays which are adjacent, in a direction around the circumference of the body, are separated by an elongate channel. The elongate channels 46 effectively alternate between the ramp arrays 42, in a direction around the circumference.

As discussed above, the elongate channels 40 of the tubular housing 16 describe the minimum width $W_2$. The ramp arrays 42 of the slip body 24 define a maximum width $W_4$ (FIG. 5). The minimum width $W_2$ of the tubular housing channels 40 is greater than the maximum width $W_4$ of the slip body ramp arrays 42, which facilitates insertion of the slip body 24 into the tubular housing 16, and removal of the slip body from the housing.

The connector 10 is selectively actuable to cause the slip teeth 30 to grip the first wellbore tubular 12. This is achieved by operating an actuating body 66, which translates the tubular housing 16 relative to the slip body 24, to cause the teeth to grip the tubular 12. The actuating body 66 is rotatable relative to the tubular housing 16 to translate the housing. To this end, the tubular housing 16 defines a first (female) part 68 of a threaded connection, and the actuating body a second (male) part 70 of a threaded connection, although the male and female parts may be oppositely arranged. Engagement of the male part 70 of the connection with the female part 68 translates the housing 16 relative to the slip body 24, causing the slip teeth 30 to grip the first wellbore tubular.

The slip body 24, in particular the slip teeth 30, describe a minimum internal diameter $D_4$ (FIG. 5) which, in at least a rest state of the slip body (prior to alignment of the slip body ramp assemblies 42 with the tubular housing ramp assemblies 36) is less than an external diameter $D_5$ of the first wellbore tubular 12 (FIG. 2). This provides an interference fit with the first tubular 12, which in turn provides an initial grip of the tubular, prior to alignment of ramp assemblies and actuation of the connector. The initial grip that is thereby provided facilitates subsequent actuation of the connector, by restricting axial translation of the slip body 24 relative to the first wellbore tubular 12 when the actuating body 66 is rotated relative to the tubular housing 16.

In the illustrated embodiment, the tubular housing 16 and the actuating body 66 are both relatively short length tubulars, known as subs. The actuating body 66 also comprises a first (male) part 72 of a further threaded connection, for connecting to a second (female) part of the connection (not shown) on the second wellbore tubular 14. In this way, the second wellbore tubular 14 can be connected to the first wellbore tubular 12 using the connector 10.

The connector 10 comprises a number of pins 74, suitably at least two, for securing the actuating body 66 against further rotation relative to the tubular housing 16, the pins typically taking the form of set screws. The pins 74 act to prevent backing-out of the male part 70 of the first threaded connection from the female part 68. The actuating body 66 also defines a shoulder 76 which is locatable within the internal bore 18 of the tubular housing 16, which is abutted by the first wellbore tubular 12 when it is positioned in the housing bore 18, as shown in FIG. 3. The shoulder 76 restricts an extent to which the first wellbore tubular 12 can be inserted into the tubular housing 16.

The tubular housing 16 comprises a first end 78 which receives the first wellbore tubular 12, and a second end 80 which is connectable to the second wellbore tubular 14, via the actuating body 66. The slip body 24 also has a first end 82 and a second end 84. The first end 82 of the slip body 24 is disposed closer to the first end 78 of the tubular housing 16 when the slip body is located in the housing. The second end 84 of the slip body 24 is disposed closer to the second end 80 of the housing 16. The tubular housing 16 comprises a shoulder 86 which abuts the second end 84 of the slip body 24, to restrict an extent to which the slip body can be inserted into the housing, as best shown in FIG. 3.

The ramps 44 of the slip body 24 each have a first end 88 disposed closer to the first end 82 of the slip body 24, and a second end 90 disposed closer to the second end 84 of the slip body. The ramps 44 of the slip body 24 are each inclined or tapered so that they describe a maximum outer diameter of the slip body at or adjacent to their second ends 90, and so that they describe a minimum outer diameter of the slip body at or adjacent their first ends 88. The ramps 44 each comprise a ramp surface 92, which is inclined relative to the longitudinal axis 50 of the slip body 24. In the illustrated embodiment, the ramp surfaces 92 describe ramp angles which are substantially constant, but in a variation the ramp angles may be non-constant, for example curved.

The ramps 38 of the tubular housing 16 also each have a first end 94 disposed closer to the first end 78 of the housing, and a second end 96 disposed closer to the second end 80 of the housing. The ramps 38 are inclined or tapered, so that they describe a maximum inner diameter of the housing 14 at or adjacent to their second ends 96, and so that they describe a minimum inner diameter of the housing at or adjacent their first ends 94. The ramps 38 each comprise a ramp surface 98, which is inclined relative to the longitudinal axis 48 of the housing 16. Again, the ramp surfaces 98 describe ramp angles which are substantially constant, but in a variation may be non-constant, for example curved.

In use, when the slip body 24 is located within the tubular housing 16, the slip body is positioned between the internal surface 20 of the housing and an external surface 114 of the first wellbore tubular 12. When the ramp arrays 42 of the slip body 24 are aligned with the ramp arrays 36 of the tubular housing 16, the ramp surfaces 92 of the slip body ramp arrays are disposed opposite and adjacent to respective ramp surfaces 98 of the tubular housing ramp arrays 36. This is best shown in FIG. 2. In this initial position, the ramp surfaces 92 and 98 are disposed in abutment along most or all of their lengths. Axial translation of the tubular housing 16 relative to the slip body 24 (by rotation of the actuating body 66 as described above) causes the housing ramps 38 to be translated relative to the slip body ramps 44, the housing ramp surfaces 98 sliding over the slip body ramp surfaces 92, as shown in FIG. 9. This in turn causes the slip body ramps 44, and so the slip body 24, to be urged radially inwardly, enhancing a gripping effect of the slip teeth 30 on the first wellbore tubular 12. The slip body 24 is shown in its final position, in which it imparts a maximum gripping effect upon the first wellbore tubular 12, in FIG. 10.

The ramp arrays 36 of the tubular housing 16 define a ramp profile, which comprises a shape and dimensions of the ramps 38, and their positioning relative to one-another. The ramp arrays 42 of the slip body 24 similarly define a ramp profile. The ramp profiles of the tubular housing ramp arrays 36 and of the slip body ramp arrays 42 substantially mirror one-another, so that they fit together and align as shown in FIG. 9. This facilitates gripping of the first wellbore tubular 12 when the connector 10 is actuated.

The ramp arrays 42 of the slip body 24 each comprise a longitudinal axis 100 (FIG. 4), which extends substantially parallel to the longitudinal axis 50 of the slip body. The elongate channels 46 of the slip body 24 also each comprise a longitudinal axis 102, which extends substantially parallel to the longitudinal axis 50 of the slip body 24. The ramps 44 of the ramp arrays 42 are disposed spaced apart along the lengths of the ramp arrays, and are arranged sequentially along the lengths of the arrays.

The ramp arrays 36 of the tubular housing 16 also each comprise a longitudinal axis 104, which extends substantially parallel to the longitudinal axis 48 of the housing 16. The elongate channels 40 of the tubular housing 16 also each comprise a longitudinal axis 106, which extends substantially parallel to the longitudinal axis 48 of the housing. The ramps 38 of the ramp arrays 36 are disposed spaced apart along the lengths of the ramp array, and are arranged sequentially along the lengths of the arrays.

The slip body 24 comprises a wall 108, and an elongate slot 110 which extends through the wall and along a length of the body. The slot 110 facilitates radial expansion and contraction of the slip body 24, by expanding and contracting a width of the slot. Expansion occurs when the slip body 24 is fitted around the first wellbore tubular 12, and contraction when the ramp arrays 42 on the slip body 24 and 36 on the tubular housing 16 cooperate, to cause the slip teeth 30 to grip the wellbore tubular.

The elongate slot 110 comprises a longitudinal axis 112 which extends substantially parallel to the longitudinal axis 50 of the slip body 24, and aligns with a ramp array 36 of the tubular housing 16 when the slip body is inserted into the housing, as best shown in FIG. 7. When the slip body 24 is rotated to align the elongate channels 46 of the slip body with the elongate channels 40 of the tubular housing 16, the elongate slot 110 aligns with one of the elongate channels of the housing, as best shown in FIG. 8. The wall 108 of the slip body 24 defines the internal surface 30 and the external surface 32 of the body. The slot 108 extends through the slip body 24 from the internal surface 32 to the external surface 30, so that the slip body is generally C-shaped.

The tubular housing 16 comprises a number of locking apertures 116 (FIG. 1) extending through a wall 118 of the housing, and in the illustrated embodiment comprises two such locking apertures. The slip body 24 also comprise a locking aperture 120 extending through the wall 108 of the body. One of the locking apertures 116 of the housing 16 is in alignment with the aperture 120 of the slip body 24, when the slip body is rotated into the position in which its ramp arrays 42 are aligned with the ramp arrays 36 of the tubular housing 16, as shown in FIG. 8. The other one of the housing apertures 116 is then aligned with the slot 110 defined by the slip body 24.

The connector 10 comprises a number of locking pins 122 (two in the illustrated embodiment), in the form of set screws. When the housing 16 and slip body 24 are aligned as discussed above, one of the pins 122 is locatable in the aligned apertures 116 and 120, which prevents further rotation of the slip body relative to the housing. The other pin 122 is located in the slot 110, and provides a backup to restrict rotation of the slip body 24. Of course, it will be understood that the locking body 52 provides the primary means of preventing rotation of the slip body 24, and so inadvertent release of the connector 10 from the first wellbore tubular 12.

The locking aperture 120 of the slip body 24 is elongate, in a direction taken along a length of the slip body, and generally oval in shape. This provides a degree of axial play in the position of the slip body 24 relative to the tubular housing 16. This facilitates application of the gripping force on the first wellbore tubular 12, by allowing translation of the tubular housing 16 relative to the slip body 24 (the ramp arrays 36 and 42 on the housing and the body then cooperating to urge the slip teeth 30 inwardly to grip the first wellbore tubular 12).

The locking body 52 also comprises a locking aperture 124, which extends through a wall of one of the locking elements 54. The locking aperture 124 of the locking body 52 aligns with the locking apertures 120/116 of the slip body 24 and the tubular housing 16 when the slip body is rotated into the position in which its ramp arrays 42 are aligned with the ramp arrays 36 of the tubular housing. The locking pin 122 may therefore pass through the tubular housing and slip body apertures 116 and 120, and into the locking body aperture 124. This provides a secure connection between the components, and retains the locking body 52 in the housing 16.

In use, the connector 10 is assembled by inserting the slip body 24 into the housing 16, and rotating it to bring the ramp assemblies 36 and 42 into alignment, as discussed above. At this time, the locking pins 122 are 'backed-off'. The slip body 24 is then in the position shown in FIG. 8. The locking body 52 is then oriented relative to the slip body 24 so that the locking elements 54 are lined up with the aligned channels 40 and 46 of the housing 16 and the slip body 24. The locking body 52 is then inserted into the housing 16 so that the locking elements 54 close the aligned channels 40 and 46, preventing rotation of the slip body 24 back to the position of FIG. 7, and so inadvertent release of the connector 10 from the first wellbore tubular 12 following actuation of the connector.

The actuating body 66 is secured to the second wellbore tubular 14 via its male connector 72. The actuating body 66 is then connected to the second end 80 of the housing 16, passing into the housing bore 18, and is advanced until it adopts an initial assembly position (shown in FIG. 2). This may be indicated by markers on the body 66, and/or by applying a certain make-up torque. The wellbore tubular 12 is then inserted into the opening 58 defined by the locking body collar 56, passing on into the bore 18 of the housing 16. The wellbore tubular 12 passes into the internal passage 26 defined by the slip body 24, the interference fit between the wellbore tubular and the slip body providing an initial 'bite' of the slip teeth 30 in the external surface 114 of the tubular.

The wellbore tubular 12 is advanced until it comes into contact with the shoulder 76 defined by the actuating body 66, and a pull test of the connector 12 is then carried out. This involves imparting an axial load on the actuating body 66. This translates the housing 16 downwardly (to the right in the drawings), the ramps 38 of the housing ramp arrays 36 urging the ramps 44 of the slip body ramp arrays 42 radially inwardly, causing the slip teeth 30 to enhance their gripping action on the first wellbore tubular 12. This opens up a small axial gap 126 between the end of the wellbore tubular 12 and the shoulder 76 of the actuating body 66, as shown in FIG. 9.

Figure 10:
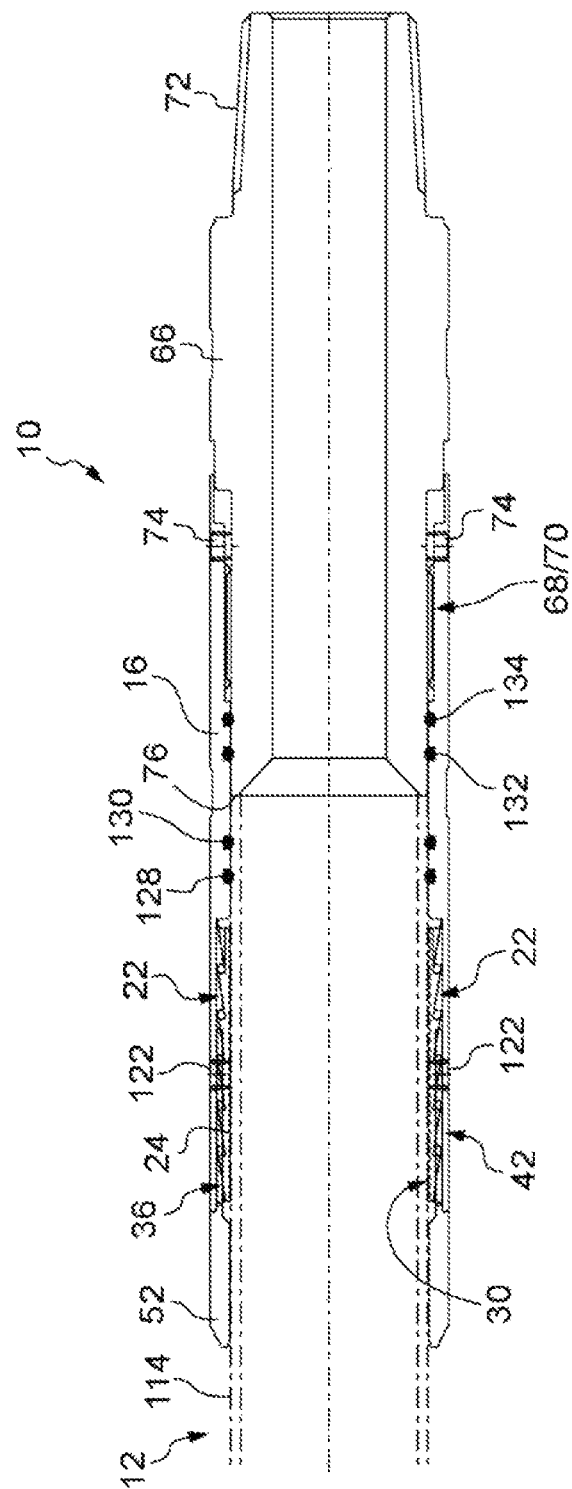

The actuating body 66 is then rotated to advance it a further distance into the housing 16, thereby closing the gap 126 (as shown in FIG. 10). This ensures against inadvertent release of the connector 10 from the first wellbore tubular 12, since axial loading on the connector could otherwise move the actuating body 66 upwardly (to the left in the drawings), closing the gap 126 and translating the housing 16 upwardly to reduce the gripping effect on the first wellbore tubular 12.

The locking pins 74 can then be tightened so as to secure the actuating body 66 against further rotation relative to the housing 16, and so to maintain the gripping force imparted on the first wellbore tubular 12. Also, the locking pins 122 can be tightened. One of the locking pins 122 is aligned with the respective apertures 116, 120 and 124 of the housing 16, slip body 24 and locking element 54. Tightening of the pin 122 therefore acts to secure the locking body 52 to the housing 16, the locking elements 54 then preventing rotation of the slip body 24 back to the position of FIG. 7, and so maintaining the ramp arrays 36 and 42 in alignment. The other locking pin 122 is aligned with the other aperture 116 of the housing 16, and the slip body slot 110. This provides a backup to prevent rotation of the slip body 24 back to the position of FIG. 7. The second wellbore tubular 14 is then securely connected to the first wellbore tubular 12 via the connector 10, and is ready to be deployed into the well.

Seals 128 and 130 carried by the housing 16 seal the housing relative to the first wellbore tubular, and seals 132 and 134 seal the housing relative to the actuating body 66, and so to the second wellbore tubular 14 connected to the actuating body. This provides a sealed fluid communication path extending from the first wellbore tubular 12, through the connector 10 to the second wellbore tubular 14.

In a variation on the above procedure, the second wellbore tubular 14 may be connected to the actuating body 66 only following making-up of the connector as described above. However, this may not be preferred in view of the torque that would be imparted to the actuating body 66 when the second tubular 14 is connected, which would be transmitted to the housing 16.

Releasing the connector 10 from the first wellbore tubular 12, and so the second wellbore tubular 14 from the first tubular, involves repeating the steps set out above in reverse.

Various modifications may be made to the foregoing without departing from the spirit or scope of the present invention.

For example, the tubular housing may comprise any suitable number of ramp arrays and elongate channels. The ramp arrays may be equally spaced apart around the perimeter of the tubular housing. The elongate channels may be equally spaced apart around the perimeter of the tubular housing. The tubular housing may comprise at least three, at least four, at least six, at least eight, and optionally more than eight ramp arrays and elongate slots. Any number between three and eight may be chosen, and optionally more than eight.

The slip body may comprise any suitable number of ramp arrays and elongate channels. The ramp arrays may be equally spaced apart around the perimeter of the slip body. The elongate channels may be equally spaced apart around the perimeter of the slip body. The slip body may comprise at least three, at least four, at least six, at least eight, and optionally more than eight ramp arrays. Any number between three and eight may be chosen, optionally more than eight. The number of elongate channels defined by the slip body may be one less than the number of ramp arrays, particularly where the slip body comprises an elongate slot as will now be described (although the slot may be considered to effectively form an elongate channel).

The connector may comprise a single slip body defining all of the ramp arrays and elongate channels. The connector may comprise a plurality of slip bodies, each slip body defining a plurality of ramp arrays and at least one elongate channel. Where there are a plurality of slip bodies, the slip bodies may cooperate on rotation, for alignment of ramp arrays of the slip bodies with ramp arrays of the tubular housing.

The invention claimed is:

1. A connector for connecting a first wellbore tubular to a second wellbore tubular, the connector comprising:
   a tubular housing having an internal bore which receives the first wellbore tubular, the tubular housing being connectable to the second wellbore tubular and comprising an internal surface which faces the internal bore and a ramp assembly arranged around the internal surface, the ramp assembly comprising:
      a plurality of elongate ramp arrays, each ramp array comprising a plurality of ramps which are inclined towards the internal bore; and
      a plurality of elongate channels which are arranged relative to the ramp arrays so that arrays which are adjacent are separated by an elongate channel;
   a slip body which is insertable into the internal bore of the tubular housing, the slip body comprising an internal passage which receives the first wellbore tubular, an internal surface which faces the internal passage and which comprises at least one slip tooth for engaging the tubular, an external surface and a ramp assembly arranged around the external surface, the ramp assembly comprising:
      a plurality of elongate ramp arrays, each ramp array comprising a plurality of ramps which are inclined away from the slip body, the ramp arrays of the slip body adapted to cooperate with the ramp arrays of the tubular housing to cause said slip tooth to grip the first wellbore tubular; and
      a plurality of elongate channels which are arranged relative to the ramp arrays so that arrays which are adjacent are separated by an elongate channel;
   in which the elongate ramp arrays of the slip body are each alignable with a respective elongate channel of the tubular housing, so that the slip body can be inserted into the tubular housing;
   and in which the slip body is rotatable within the tubular housing, so that the ramp arrays of the slip body can each be brought into alignment with a respective ramp array of the tubular housing.

2. A connector as claimed in claim 1, in which the connector is a coiled tubing connector, the first wellbore tubular is a coiled tubing, the second wellbore tubular forms part of a tool string comprising a tool adapted to be located in the well, and in which the coiled tubing connector is for connecting the coiled tubing to the second wellbore tubular.

3. A connector as claimed in claim 1, in which the slip body is rotatable within the tubular housing so that the elongate channels of the slip body can each be brought into alignment with a respective elongate channel of the tubular housing.

4. A connector as claimed in claim 1, in which the connector comprises a locking body, the locking body comprising a plurality of elongate locking elements, each locking element being locatable in a respective one of the aligned channels of the tubular housing and the slip body, to lock the slip body against further rotation within the tubular housing.

5. A connector as claimed in claim 4, in which each locking element is dimensioned so that it at least closes the elongate channel of the slip body.

6. A connector as claimed in claim 5, in which each locking element is dimensioned so that it closes at least part of the tubular housing elongate channel.

7. A connector as claimed in claim 4, in which the locking body comprises a collar defining an opening that receives the first wellbore tubular, and in which the locking elements extend from the collar.

8. A connector as claimed in claim 4, in which:
   the locking elements define a maximum width; and
   the elongate channels of the tubular housing define a minimum width which is greater than the maximum width of the locking elements.

9. A connector as claimed in claim 4, in which:
the locking elements define a maximum width; and
the elongate channels of the slip body define a minimum width which is greater than the maximum width of the locking elements.

10. A connector as claimed in claim 4, in which:
the locking elements each have an inner surface, which together describe a minimum inner diameter;
the elongate channels of the slip body each comprise a base, which together describe a maximum outer diameter; and
the minimum inner diameter described by the locking element inner surfaces is greater than the maximum outer diameter described by the slip body bases.

11. A connector as claimed in claim 10, in which the ramp arrays of the slip body together describe a maximum outer diameter which is greater than the minimum inner diameter described by the locking element inner surfaces.

12. A connector as claimed in claim 1, in which the ramp assembly of the tubular housing is arranged around a perimeter of the tubular housing, and in which the plurality of elongate channels of the tubular housing are arranged relative to the ramp arrays so that arrays which are adjacent, in a direction around the perimeter of the housing, are separated by an elongate channel.

13. A connector as claimed in claim 12, in which the ramp arrays are spaced apart around the perimeter of the housing, the elongate channels are spaced apart around the perimeter of the housing, and in which elongate channels alternate between the ramp arrays, in a direction around the perimeter.

14. A connector as claimed in claim 1, in which the ramp assembly of the slip body is arranged around a perimeter of the body, and in which the plurality of elongate channels of the slip body are arranged relative to the ramp arrays so that arrays which are adjacent, in a direction around the perimeter of the body, are separated by an elongate channel.

15. A connector as claimed in claim 14, in which the ramp arrays are spaced apart around the perimeter of the body, the elongate channels are spaced apart around the perimeter of the body, and elongate channels alternate between the ramp arrays, in a direction around the perimeter.

16. A connector as claimed in claim 1, in which the connector is selectively actuable to cause said slip tooth to grip the first wellbore tubular, the connector comprising an actuating body which is adapted to translate the tubular housing relative to the slip body, to cause said slip tooth to grip the first tubular.

17. A connector as claimed in claim 16, in which the actuating body is rotatable relative to the tubular housing to translate the housing.

18. A connector as claimed in claim 16, in which the tubular housing defines a first part of a threaded connection, and the actuating body defines a second part of the threaded connection, engagement of the first and second parts causing translation of the housing relative to the slip body.

19. A connector as claimed in claim 18, in which the actuating body comprises a first part of a further threaded connection, for connecting to a second part of the further threaded connection on the second wellbore tubular.

20. A connector as claimed in claim 16, in which the actuating body comprises a shoulder which is locatable within the internal bore of the tubular housing and adapted to abut the first wellbore tubular, to limit an extent to which the first wellbore tubular can be inserted into the tubular housing.

21. A connector as claimed in claim 1, in which:
the tubular housing comprises a first end which receives the first wellbore tubular, and a second end which is connectable to the second wellbore tubular; and
the slip body has a first end which is disposed, in use, closer to the first end of the tubular housing and a second end which is disposed, in use, further away from the first end of the tubular housing and closer to the second end of the housing.

22. A connector as claimed in claim 21, in which the tubular housing comprises a shoulder which is adapted to abut the second end of the slip body to restrict an extent to which the slip body can be inserted into the tubular housing.

23. A connector as claimed in claim 21, in which:
the ramps of the slip body each have a first end disposed closer to the first end of the slip body, and a second end disposed closer to the second end of the slip body; and
the ramps of the slip body are inclined so that they describe a maximum outer diameter of the slip body at or adjacent to their second ends, and a minimum outer diameter of the slip body at or adjacent their first ends.

24. A connector as claimed in claim 23, in which:
the ramps of the tubular housing each have a first end disposed closer to the first end of the housing, and a second end disposed closer to the second end of the housing; and
the ramps of the housing are inclined so that they describe a maximum inner diameter of the housing at or adjacent to their second ends, and a minimum inner diameter of the housing at or adjacent their first ends.

25. A connector as claimed in claim 24, in which:
the maximum inner diameter defined by the housing ramps is greater than the maximum outer diameter defined by the slip body ramps; and
the minimum inner diameter defined by the housing ramps is greater than the minimum outer diameter defined by the slip body ramps.

26. A connector as claimed in claim 1, in which the ramp arrays of the tubular housing define a ramp profile, and the ramp arrays of the slip body define a ramp profile, the ramp profiles of the tubular housing and of the slip body being mirror images of one another.

27. A connector as claimed claim 1, in which:
the ramp arrays of the slip body each comprise a longitudinal axis which extends substantially parallel to a longitudinal axis of the slip body, the ramps of the ramp array disposed spaced apart along a length of the ramp array;
the ramp arrays of the tubular housing each comprise a longitudinal axis which extends substantially parallel to a longitudinal axis of the housing, the ramps of the ramp array disposed spaced apart along a length of the ramp array.

28. A connector as claimed in claim 1, in which the slip body comprises a wall and an elongate slot which extends through the wall and along a length of the body, to facilitate radial expansion and contraction of the slip body, the elongate slot comprising a longitudinal axis which extends substantially parallel to a longitudinal axis of the slip body.

29. A connector as claimed in claim 28, in which the elongate slot aligns with a ramp array of the tubular housing when the slip body is inserted into the housing, and with an elongate channel of the tubular housing when the slip body is rotated to align the elongate channels of the slip body with the elongate channels of the tubular housing.

30. A connector as claimed in claim 1, in which the connector comprises a single slip body defining all of the ramp arrays and elongate channels.

31. A connector as claimed in claim 1, in which the tubular housing comprises at least three ramp arrays and at least three elongate slots.

32. A connector as claimed in claim 1, in which the slip body comprises at least three ramp arrays.

33. A connector as claimed in claim 1, in which the number of elongate channels defined by the slip body is one less than the number of ramp arrays.

34. A connector as claimed in claim 1, in which:
the elongate channels of the tubular housing describe a minimum width;
the ramp arrays of the slip body define a maximum width; and
the minimum width of the tubular housing elongate channels is greater than the maximum width of the slip body ramp arrays.

35. A connector as claimed in claim 1, in which the slip body describes a minimum internal diameter which, in at least a rest state of the slip body, is less than an external diameter of the first wellbore tubular, to provide an interference fit with the first tubular and so an initial grip of the tubular.

36. A connector as claimed in claim 1, in which:
the tubular housing comprises a locking aperture extending through a wall of the housing, and the slip body comprises a locking aperture extending through a wall of the body, the locking apertures being in alignment when the slip body is rotated into a position in which its ramp arrays are aligned with the ramp arrays of the tubular housing; and
the connector comprises a locking pin which is locatable in the aligned apertures, to prevent further rotation of the slip body relative to the housing.

37. A connector as claimed in claim 36, in which the locking aperture of the slip body is elongate, in a direction taken along a length of the slip body, to provide a degree of axial play in the position of the slip body relative to the tubular housing.

38. A connector as claimed in claim 36, in which:
the connector comprises a locking body, the locking body comprising a plurality of elongate locking elements, each locking element being locatable in a respective one of the aligned channels of the tubular housing and the slip body, to lock the slip body against further rotation within the tubular housing; and
the locking body comprises a locking aperture which aligns with the locking apertures of the slip body and the tubular housing when the slip body is rotated into the position in which its ramp arrays are aligned with the ramp arrays of the tubular housing, the locking pin passing through the tubular housing and slip body apertures and into the locking body aperture.

39. A method of connecting a first wellbore tubular to a second wellbore tubular using a connector comprising:
a tubular housing having an internal bore, an internal surface which faces the internal bore and a ramp assembly arranged around the internal surface, the ramp assembly comprising:
a plurality of elongate ramp arrays, each ramp array comprising a plurality of ramps which are inclined towards the internal bore; and
a plurality of elongate channels which are arranged relative to the ramp arrays so that arrays which are adjacent are separated by an elongate channel;
a slip body comprising an internal passage, an internal surface which faces the internal passage and which comprises at least one slip tooth, an external surface and a ramp assembly arranged around the external surface, the ramp assembly comprising:
a plurality of elongate ramp arrays, each ramp array comprising a plurality of ramps which are inclined away from the slip body; and
a plurality of elongate channels which are arranged relative to the ramp arrays so that arrays which are adjacent are separated by an elongate channel;
in which the method comprises the steps of:
aligning each elongate ramp array of the slip body with a respective elongate channel of the tubular housing, and inserting the slip body into the tubular housing so that said ramp arrays are located in said channels;
rotating the slip body within the tubular housing, to bring each of the ramp arrays of the slip body into alignment with a respective ramp array of the tubular housing;
locating a first wellbore tubular within the internal bore of the tubular housing, the wellbore tubular passing along the internal passage of the slip body so that the slip body is located between the internal surface of the tubular housing and an external surface of the wellbore tubular;
actuating the connector so that the ramp arrays of the slip body cooperate with the ramp arrays of the tubular housing, to cause said slip tooth to grip the first wellbore tubular; and
connecting the tubular housing to the second wellbore tubular.

* * * * *